United States Patent
Ohrui

(10) Patent No.: US 6,562,428 B1
(45) Date of Patent: May 13, 2003

(54) ANTISTATIC ADHESIVE SHEET

(75) Inventor: Tomoo Ohrui, Saitama-ken (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 09/533,933

(22) Filed: Mar. 23, 2000

(30) Foreign Application Priority Data

Mar. 25, 1999 (JP) .......................................... 11-081346

(51) Int. Cl.⁷ ................................................ B32B 33/00
(52) U.S. Cl. .................... 428/40.1; 428/41.7; 428/42.1; 428/212; 428/354; 503/227
(58) Field of Search ............................. 428/40.1, 41.7, 428/42.1, 354, 212; 503/227

(56) References Cited

U.S. PATENT DOCUMENTS

| | | | | |
|---|---|---|---|---|
| 5,427,835 A | * | 6/1995 | Morrison | 428/96 |
| 5,451,560 A | * | 9/1995 | Akada | 503/227 |
| 5,478,631 A | * | 12/1995 | Kawano | 428/212 |

* cited by examiner

*Primary Examiner*—Nasser Ahmad
(74) *Attorney, Agent, or Firm*—Oblon, Spivak, McClelland, Maier & Neustadt, P.C.

(57) ABSTRACT

There is disclosed an antistatic adhesive sheet comprising a plastic substrate film (e.g. PET film), an antistatic layer which is formed on either side thereof and which comprises a quaternary ammonium salt, preferably a high molecular type quaternary ammonium salt, and an adhesive agent layer (e.g. acrylic-based adhesive layer) formed on the antistatic layer, and further at need, a coat layer which is an easy-to-print layer or a scratch resistance coat layer and which is formed on the opposite side of the adhesive agent layer for the plastic substrate film. The antistatic adhesive sheet suppresses the bleed out of an antistatic agent, preserves favorable transparency hardly causing a decrease in light transmissivity, and can suppress the adhesion of dirt, etc. and electrostatic troubles. Accordingly, it is well suited for antistatic purpose of use in the articles required for transparency for a cover sheet.

18 Claims, No Drawings

ANTISTATIC ADHESIVE SHEET

BACKGROUND OF THE INVENTION

1. Field of the Invention

The present invention relates to an antistatic adhesive sheet. More particularly, the present invention pertains to an antistatic adhesive sheet which is excellent in antistatic properties and transparency, suppresses the bleed out of an antistatic agent and the generation of a gas, is capable of suppressing the adhesion of dirt, dust and the like, and the occurrence of a variety of troubles due to static electricity by sticking to an adherent so as to prevent the electric charging thereof, and in particular, is well suited for antistatic purpose of use in the products and articles that are required for transparency for a cover sheet.

2. Description of the Related Arts

A material having high insulation resistance such as plastics and the like has such a property that accumulates the static electricity which is generated by the friction or peeling between plastic and plastic or between plastic and an other object without leaking said electricity, that is, being electrically charged. The aforesaid property brings about not only unfavorable adhesion of dirt, dust and the like contained in the air, sticking of paper and paper or of film and film, uncomfortable feeling by an electric shock, but also various troubles and malfunctions such as erroneous actions and destroy of a memory due to static electricity, when used in electronic or electrical equipment and machinery, office automation equipment and machinery or the like.

In order to avoid such troubles or malfunctions, it is necessary to control the surface specific resistivity of an object to be charged, and thus an antistatic agent is usually employed.

As antistatic methods for a plastic product, there are generally available a method in which an antistatic agent is internally added (kneading) to the product, and a method in which an antistatic agent is applied to the surface thereof. Although the former method has favorable durability of antistatic effect, it suffers from the disadvantage that it is more prone to impair the characteristics inherent in plastics. On the other hand, although the latter method does not impair the characteristics inherent in plastics, it suffers from the drawback of inferiority in durability of antistatic effect.

An antistatic adhesive tape has heretofore been known, and is used in taping job to be carried out at the time of packaging and storing electronic part items that are sensitive to static electricity, specifically, sealing of a shield back, sealing of a carton, holding a worksheet, bundling electro-conductive trays and the like. Moreover, a transparent antistatic adhesive tape is useful, for instance, as a sticking sheet for partitions and windows of a clean room, machine covers and various vessels used there, etc. in a factory and laboratory in the fields of electronic or electrical equipment and machinery, bionics, medicals, communication equipment and machinery, and the like. The aforesaid tape is also useful as a label for a hard disc used for a personal computer and as a protective sheet for an optomagnetic disc. In general, said optomagnetic disc is of the structure in which a transparent substrate is equipped thereon with a recording layer, on which is installed a protective layer. The writing and reading of information on said disc is carried out by laser light, which is irradiated via the substrate, and forms a focus on the recording layer. Dirt, dust or the like, when being adhered to or injures the substrate in such optomagnetic disc, becomes the cause for erroneous operation due to the deviation of a focus by the scattering-actions of the laser light or the like. In particular, since the beam bundle for reading out has the tendency to be miniaturized, further importance has been attached to the antistatic treatment and scratch resistance treatment on the surface of the substrate.

The above-mentioned antistatic adhesive tape and adhesive sheet are generally of the structure in which an adhesive agent layer is formed on one side of a plastic substrate film to which is internally added an antistatic agent, or of the structure in which an adhesive agent layer is formed on one side of a plastic substrate film, and an antistatic layer is formed on the opposite side thereof. The aforesaid adhesive agent layer is usually superimposed thereon with a release sheet for the purpose of protecting said adhesive agent layer.

As mentioned hereinbefore, however, the plastic substrate film to which an antistatic agent is internally added, has a fear of impairing the characteristics inherent in plastic substrate film. On the other hand, an antistatic layer which is formed on the opposite side of the adhesive agent layer brings about the problem that the adhesivity between said antistatic layer and, for instance, an easy-to-print layer or a scratch resistance coat layer, is extremely worsened in the case where such a layer is formed on said antistatic layer. In addition, when said antistatic layer is devoid of any cover layer thereon, there is caused a fear of unfavorable circumstances such that the antistatic agent bleeds out and a gas is generated therefrom. Such phenomenon is particularly remarkable in the case of a low molecular antistatic agent.

SUMMARY OF THE INVENTION

Under such circumstances, a general object of the present invention is to provide an antistatic adhesive sheet which is excellent in antistatic properties and transparency, suppresses the bleed out of an antistatic agent and the generation of a gas, is capable of suppressing the adhesion of dirt, dust and the like, and the occurrence of a variety of troubles due to static electricity by sticking said sheet to an adherent so as to prevent the electric charging thereof, and in particular is well suited for antistatic purpose of use in the products and articles that are required for transparency for a cover sheet.

Other objects of the present invention will be obvious from the text of this specification hereinafter disclosed.

As a result of intensive extensive research and investigation accumulated by the present inventors in order to develop an antistatic adhesive sheet having the foregoing excellent functions, it has been found that the objects of the invention are achieved by forming a plastic substrate film on one side with an antistatic layer comprising a quaternary ammonium salt, especially a high molecular type quaternary ammonium salt, and further forming thereupon, an adhesive agent layer. The present invention has been accomplished by the aforestated findings and information.

That is to say, the present invention provides an antistatic adhesive sheet comprising a plastic substrate film, an antistatic layer which is formed on either side thereof and which comprises a quaternary ammonium salt, preferably a high molecular type quaternary ammonium salt, and an adhesive agent layer formed on said antistatic layer.

DESCRIPTION OF THE PREFERRED EMBODIMENTS

The plastic substrate film which is employed in the antistatic adhesive sheet according to the present invention (hereinafter sometimes referred to as "adhesive sheet according to the present invention"), is not specifically limited, but may be properly selected for use from the well known films which have heretofore been used as a substrate film for an adhesive sheet and which comprise at least one resin selected from the group consisting of polyoletinic resin such as polyethylene and polypropylene; ethylene copolymer-based resin such as ethylene/vinyl acetate copolymer and ethylene/vinyl chloride copolymer; polystyrene-based resin such as polystyrene, ABS (acrylonitrile/butadiene/styrene) resin and AS (acrylonitrile/styrene) resin; polyamide-based resin such as nylon 6 and nylon 6, 6; polyester-based resin such as polyethylene terephthalate, polybutylene terephthalate and polyethylene naphthalate; polycarbonate-based resin such as polycarbonate and polyester carbonate; polysulfone-based resin such as polyether sulfone and polyamine sulfone; fluorine-based resin such as polytetrafluoroethylene, polyvinylidene fluoride; chlorine-based resin such as polyvinyl chloride and polyvinylidene chloride; acrylic resin such as polymethyl methacrylate and polyethyl methacrylate; polyvinyl alcohol, polyvinyl acetate, ionomer resin, polyacetal, polyamide imide, polyether imide, thermoplastic imide, polyether ether ketone, polyphenylene ether, polyphenylene sulfide and polymethylpentene.

The plastic substrate film may be a monolayer film or a laminate film having at least two layers, and may be a colored film including white film. With regard to the adhesive sheet according to the present invention, the sheet has preferably transparency, more preferably has a transmissivity for total light of at least 80%.

The thickness of the plastic substrate film in the adhesive sheet according to the present invention is not specifically limited, but is properly selected according to the purpose of use and the like, and it is in the range of usually 10 to 300 µm, preferably 20 to 150 µm. The above-mentioned plastic substrate film may be that obtained by any of conventional well known film-forming methods that are exemplified by casting method, extrusion method, calendering method and solution coating method, and also may be any of non oriented film or oriented film.

In the adhesive sheet of the present invention, a surface treatment may be applied as desired, to the plastic substrate film on either or both sides thereof, or a primer layer may be formed thereon on either or both sides thereof for the purpose of improving the adhesivity to the antistatic layer to be formed thereon or a cover layer to be formed on the opposite side as the case may be. The aforesaid surface treatment method is exemplified by surface unevenness treatment method by means of sand blasting method or solvent treatment method, and surface oxidation method by means of corona discharge, chromic acid treatment,flame treatment, hot gas treatment, ozone/UV rays irradiation treatment. The primer is not specifically limited, but may be selected for use from conventional well known primers of acrylate base, polyester base, polyurethane base, silicone base and rubber base, respectively. Judging from the durability and adhesivity, acrylate-based and polyester-based primers are preferable. The thickness of the primer layer is in the range of preferably 0.1 to 10 µm, more preferably 0.5 to 5 µm from the aspect of uniform coatability and adhesivity.

In the adhesive sheet according to the present invention, the plastic substrate film is formed on either side with an antistatic layer comprising a quaternary ammonium salt.

As the quaternary ammonium salt used as an antistatic agent in the antistatic layer, there is usable any of low molecular and high molecular types, of which is preferable a high molecular type quaternary ammonium salt in view of the preventive properties of bleed out of the antistatic agent and gas generation, and no need of using a binder, and the like factors.

The foregoing high molecular type quaternary ammonium salt may be arbitrarily properly selected for use from conventional well known ones, specifically exemplified by high molecular polymer which has a quaternary ammonium base in the molecule, and which is represented by the general formula (I)

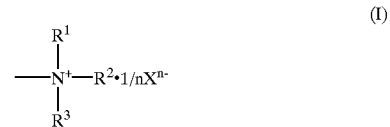

wherein $R^1$ and $R^2$ are each an alkyl group having 1 to 10 carbon atoms and may be the same or different, $R^3$ is an alkyl group having 1 to 10 carbon atoms or an aralkyl group having 7 to 10 carbon atoms, $X^{n-}$ is an n-valency anion, and n is an integer from 1 to 4. Preferably, said quaternary ammonium salt has a weight-average molecular weight of 10,000 to 1,000,000.

The alkyl groups indicated by $R^1$ and $R^2$, respectively and the alkyl group indicated by $R^3$ are each preferably an alkyl group having 1 to 6 carbon atoms, more preferably an alkyl group having 1 to 4 carbon atoms, which is exemplified by methyl group, ethyl group, n-propyl group, isopropyl group, n-butyl group, isobutyl group, sec-butyl group and tert-butyl group; and the aralkyl group indicated by $R^8$ is preferably benzyl group.

On the one hand, $X^{n-}$ may be either an inorganic anion or an organic anion, and is exemplified by inorganic anions such as halogen ions including $F^-$, $Cl^-$, $Br^-$ and $I^-$, $N_3^-$, $ClO_4^-$, $BF_4^-$, $CO_3^{2-}$, $SO_4^{2-}$, and organic anions such as $CH_3OSO_3^-$ and $C_2H_5OSO_3^-$, and organic anions each composed of a residual group of an organic acid such as acetic acid, malonic acid, succinic acid, maleic acid, fumaric acid, p-toluenesulfonic acid-and trifluoroacetic acid.

Examples of the high molecular type quaternary ammonium salt include compounds of respective types of polyvinyl benzyl {(a)}, poly(meth)acrylate {(b)}, styrene/(meth)acrylate copolymer {(c)}, styrene/maleimide copolymer {(d)} and methacrylate/methacrylimide copolymer {(e)}. The copolymers of the types (c), (d) and (e) may be each a random copolymer or a block copolymer.

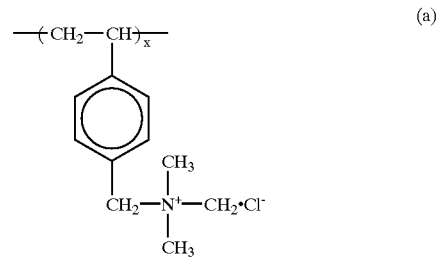

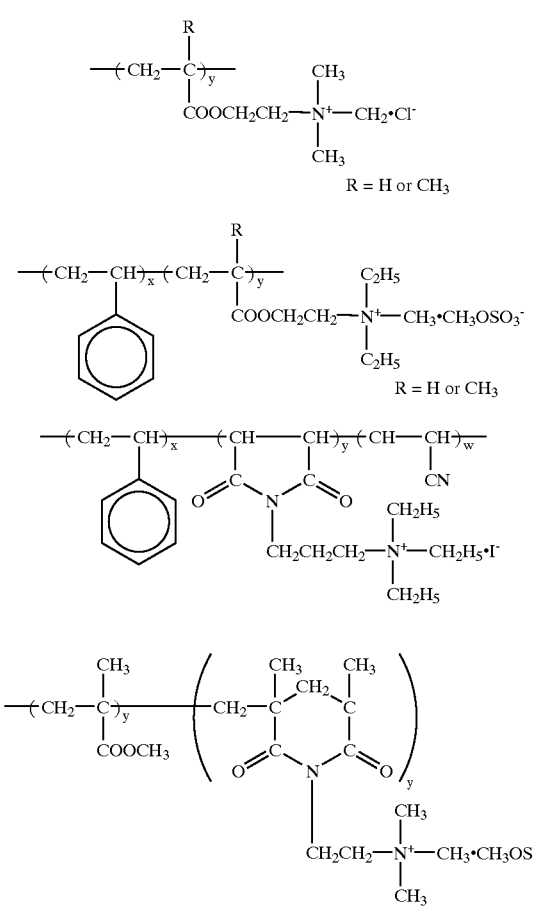

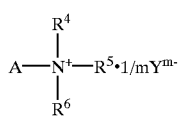

x, y, w: Degree of Polymerization

The high molecular type quaternary ammonium salt in the present invention may be used alone or in combination with at least one other, and as desired in combination with a low molecular type quaternary ammonium salt. In the present invention, a low molecular type quaternary ammonium salt may be used in combination with a high molecular binder (for instance, acrylic binder).

Preferable examples of the foregoing low molecular type quaternary ammonium salt include the compound represented by the general formula (II)

$$A-\overset{R^4}{\underset{R^6}{N^+}}-R^5 \cdot 1/mY^{m-} \quad (II)$$

wherein A is an alkyl group having 1 to 30 carbon atoms, $R^4$ and $R^5$ are each an alkyl group having 1 to 10 carbon atoms and may be the same or different, $R^6$ is an alkyl group having 1 to 10 carbon atoms or an aralkyl group having 7 to 10 carbon atoms, $Y^{m-}$ is an m-valency anion, and m is an integer from 1 to 4.

Examples of the group A in the general formula (II) include methyl group, ethyl group, n-propyl group, isopropyl group, n-butyl group, isobutyl group, sec-butyl group, tert-butyl group, pentyl group, hexyl group, heptyl group, octyl group, decyl group, dodecyl group such as lauryl group, tetra decyl group such as myristyl group, hexadecyl group such as palmityl group, octadecyl group such as stearyl group, eicosyl group and behenyl group.

$R^4$, $R^5$, $R^6$, $Y^{m-}$ and m in the general formula (II) are same as $R^1$, $R^2$, $R^3$, $X^{n-}$ and n in the general formula (I), respectively.

The antistatic layer in the present invention can be formed by a method comprising the steps of coating the substrate film with a coating solution of the above-mentioned high molecular type quaternary ammonium salt and low molecular type quaternary ammonium salt to be combined as desired in a proper solvent or a coating solution of the above-mentioned high molecular type quaternary ammonium salt, low molecular type quaternary ammonium salt and a proper binder in a proper solvent by means of a conventional well known method such as bar coat method, knife coat method, roll coat method, blade coat method, dicoat method or gravure coat method to form a coated film, and subsequently drying the resultant film.

The thickness of the antistatic layer in the adhesive sheet is not specifically limited, but is properly selected according to the purpose of use and the like, and it is usually in the range of 0.01 to 10 μm. A thickness thereof, when being less than 0.01 μm, brings about a fear of failure to sufficiently exhibit the antistatic effect, whereas a thickness thereof, when being more than 10 μm, leads to a tendency to lower the adhesion to the adhesive agent layer. In view of the foregoing, the preferable thickness of the antistatic layer is in the range of 0.05 to 1 μm.

The antistatic layer formed in such a manner is excellent in transparency. As powdery antistatic agents, there are known metallic electroconductive fillers such as Ag, Cu, Al, Ni, Sn, Fe, Pb, Ti, Mo, W, Ta, Nb, Pt, Au, Pd, Cu-Sn alloy and Cu-Zn alloy; metal compound-based electroconductive fillers such as zinc oxide base, barium sulfate base, titanium oxide base, boroaluminum base, tin oxide base, titanium black base, potassium titanate base, indium oxide base and indium tin oxide (ITO), and carbon black. However, with the exception of the ITO and the like as a special filler, the antistatic layer comprising the above-exemplified powdery antistatic agent is generally colored or inferior in transparency, and accordingly the antistatic adhesive sheet comprising the same is involved in the problem of being difficult to apply to the field where optional coloration or transparency is required as a covering sheet. As opposed to the foregoing, the antistatic adhesive sheet according to the present invention is excellent in light transmissivity and is almost free from being colored and a decrease in light transmissivity, thereby rendering itself well suited for the application to the field where coloration or transparency is required.

The antistatic adhesive sheet according to the present invention is equipped with an adhesive agent layer on the antistatic layer formed in the aforesaid manner. The adhesive agent (hereinafter referred to as "adhesive") which forms said adhesive agent layer is not specifically limited, but may be selected for use from the adhesives that have heretofore been used for adhesive agent layer in adhesive sheet such as acrylic-based adhesive, rubber-based adhesive and silicone-based adhesive.

There are used, as the aforesaid acrylic-based adhesive, those comprising as a principal component, at least one member selected from the group consisting of an acrylic ester homopolymer, a copolymer containing at least two acrylic ester units and a copolymer of an acrylic ester and an other functional monomer. Examples of said acrylic ester include butyl (meth)acrylate, pentyl (meth)acrylate, hexyl (meth)acrylate, heptyl (meth)acrylate, octyl (meth)acrylate, nonyl (meth)acrylate and decyl (meth)acrylate. Examples of said other functional monomer include hydroxyl group-containing monomer such as hydroxyethyl (meth)acrylate and hydroxypropyl (meth)acrylate, and amide group-containing monomer such as (meth)acrylamide and dimethyl(meth)acrylamide.

In general, the acrylic-based adhesive is roughly divided into a solvent type adhesive and emulsion type adhesive. The solvent type adhesive is composed usually of the aforesaid acrylic-based polymer, a solvent, a crosslinking agent, and as desired, a tackifying agent and the like, and there are utilized as the crosslinking system, methylol group condensation, ionic crosslinking, urethane crosslinking, and epoxy crosslinking. The emulsion type adhesive is composed usually of the acrylic based polymer, an emulsifying agent, an aqueous solvent, and as desired, a tackifying agent and the like.

There are used, as the aforesaid rubber-based adhesive, those comprising as a principal component, at least one member selected from the group consisting of natural rubber, polyisoprene rubber, polyisobutylene, polybutadiene rubber, styrene/butadiene/styrene block copolymer and styrene/isoprene/styrene block copolymer. Said rubber-based adhesive may be blended as desired, with a tackifying agent, plasticizer, age resister, tiller and the like, and is usually preferably in the form of solvent type, or emulsion type in which the latex of the foreqoing rubber is used.

There are preferably used, as the aforesaid silicone-based adhesive, a solvent type silicone-based adhesive comprising as a principal component, polydimethylsiloxane or polydiphenylsiloxane, and as desired, a tackifying agent, plasticizer, filler and the like.

The thickness of the adhesive agent layer is in the range of usually 5 to 100 $\mu$m, preferably 10 to 60 $\mu$m.

By forming the adhesive agent layer on the antistatic agent layer in such a manner, it is made possible to effectively suppress the bleed out of the quaternary ammonium salt as well as gas generation therefrom.

In the adhesive sheet according to the present invention, a release sheet layer may be formed, as desired, onto the above-mentioned adhesive agent layer. Examples of the release sheet include paper such as glassine paper, coated paper and laminated paper or a variety of plastics, said sheet being coated with a release agent such as silicone resin.

In the adhesive sheet according to the present invention, a coat layer having a desired function may be formed, at need, on the opposite side of the above-mentioned adhesive agent layer of the plastic substrate film. The function of said coat layer is not specifically limited, but is properly selected for use in accordance with the purpose of use of said adhesive sheet. Preferable examples of the cover layer include an easy-to-print layer capable of imparting printability to said adhesive sheet, and a scratch resistance coat layer capable of imparting scratch resistance thereto.

The material constituting the above-mentioned easy-to-print layer needs only to be capable of forming a cover layer which has favorable adhesivity to the plastic substrate film and which imparts a printing ink with favorable adhesivity to the layer. Examples of such materials include organic bonding agents such as acrylic resin, styrenic resin, crosslinked polyester-urethane-based resin, polyester-based resin, polyurethane based-resin, polyol-based resin, polyvinyl alcohol based resin, polyvinyl pyrrolidone-based resin, cellulose derivatives, acetate derivatives, polyvinyl chloride-based resin, polyimide-based resin, latex resin, starch, gelatin, vegetable protein, casein, arabic gum and albumin; inorganic bonding agents such as silica sol, alumina sol, zirconia sol and titania sol, and as desired, roughness forming agents exemplified by inorganic powder such as silica, zirconia, clay, talc, kaolin, diatomaceous earth, alumina, titania, zeolite, calcium carbonate, barium sulfate, aluminum hydroxide, magnesium hydroxide, calcium phosphate and glass; and organic powder such as acrylic resin, urethane resin, vinyl chloride resin, benzoguanamine resin, benzoguanamine/melamin/formaldehyde condensation product, ion exchange resin, urea resin and polystyrenic resin. These materials constituting said easy-to-print layer may be properly selected for use according to the types of the resin which constitutes the plastic substrate film. In addition, in the case where the adhesive sheet of the present invention is called upon to be transparent, said easy-to-print layer is preferably transparent as well.

A method for coating the plastic substrate film with the aforesaid material is not specifically limited, but there are usable previously well-known methods such as bar coat method, knife coat method, roll coat method, blade coat method, dicoat method and gravure coat method. The thickness of said easy-to-print layer is selected in the range of usually 0.2 to 30 $\mu$m, preferably 0.5 to 30 $\mu$m.

On the other hand, as the scratch resistance coat layer, there is preferably used an ionizing radiation curing resin which is curable by irradiation of UV ray, electron beams, etc., of which UV ray curing resin is particularly preferable. Said UV ray curing resin is not specifically limited, but may be properly arbitrarily selected for use from previously well-known ones. The UV ray curing resin usually comprises a photo-polymerizable prepolymer as a major component, and as desired, a photopolymerizable monomer and a photopolymerization initiator. Examples of the photopolymerizable prepolymers include radical polymerization type prepolymers of, for example, polyester acrylate base, epoxy acrylate base, urethane acrylate base and polyol acrylate base, respectively, and cation polymerization type prepolymers of epoxy base resin, etc. Examples of said photopolymerization initiators include those of, for example, benzoin base, acetophenone base, benzophenone base, anthraquinone base and thioxanthene base in the case where a radical polymerization type photopolymerizable prepolymer is used; and also include the compound of an onium ion and an anion, wherein said onium ion is exemplified by sulfonium ion and iodonium ion, and said anion is exemplified by tetrafluoroborate and hexafluorophosphate in the case where a cation polymerization type photopolymerizable prepolymer is used. Said photopolymerizable monomer is not specifically limited, but may be used by properly selecting at least one species from a monofunctional monomer having one ethylenically unsaturated group in one molecule and a multifunctional monomer having at least two ethylenically unsaturated groups in one molecule.

The scratch resistance coat layer in the adhesive sheet can be formed by a method comprising the steps of coating the substrate film on the opposite side of the adhesive agent layer with a coating solution of the above-mentioned ionizing radiation curing resin in a proper solvent by means of a conventional well known method such as bar coat method, knife coat method, roll coat method, blade coat method, dicoat method or gravure coat method to form coated film, subsequently drying the resultant film, and thereafter curing the dried film by irradiating the same with ionizing radiation such as UV ray or electron ray. The thickness of the scratch resistance coat layer in the adhesive sheet is in the range of usually 0.5 to 20 $\mu$m, preferably 1 to 15 $\mu$m.

In the antistatic adhesive sheet according to the present invention, any of a variety of additives such as UV ray absorber, light stabilizing agent and antioxidant may be incorporated, at need, in the aforesaid antistatic layer, adhesive agent layer, and a coat layer such as the easy-to-print layer or scratch resistance coat layer which is formed as required. The antistatic adhesive sheet, which is excellent in transparency, is useful for instance, as a sticking sheet for partitions and windows of a clean room, machine covers and a variety of vessels used there, etc. for a factory and a laboratory in the fields of electronic or electrical equipment, bionics, medicals, communication equipment and machinery, and the like. The aforesaid tape is also useful as a label for a hard disc used for a personal computer and as a protective sheet for an optomagnetic disc.

In addition, the antistatic adhesive sheet according to the present invention can be used as an antistatic adhesive tape in taping job to be carried out at the time of packaging and storing electronic part items that are sensitive to static electricity, specifically, sealing of a shield back, sealing of a carton, holding a worksheet, bundling electroconductive trays and the like. Furthermore, the antistatic adhesive sheet is also useful as an adhesive sheet for the protection and die processing, for instance, of a substrate for silicon wafers, glass, ceramics and polymers at the time of producing electronic or electrical parts items or semiconductor parts items.

In summarizing the working effects and advantages of the present invention, the antistatic adhesive sheet suppresses the bleed out of an antistatic agent and the generation of a gas, preserves favorable transparency hardly being colored or causing a decrease in light transmissivity, is capable of suppressing the adhesion of dirt, dust and the like, and the occurrence of a variety of troubles due to static electricity by sticking to an adherent so as to prevent the electric charging thereof, and in particular, is well suited for antistatic purpose of use in the products and articles that are required for transparency for a cover sheet.

In what follows, the present invention will be described in more detail with reference to comparative examples and working examples, which however shall never limit the present invention thereto.

EXAMPLE 1

An antistatic layer was formed by a method wherein a biaxially oriented polyethylene terephthalate (PET) film having a thickness of 38 μm as the plastic substrate film, was formed on one side with an easy-to-print layer with a thickness of 0.1 μm which had been formed by the use of polyester-based resin, and the other side was coated with a quaternary ammonium salt-containing surface coating type antistatic agent solution consisting of 34% by weight of poly(meth)acrylate type quaternary ammonium salt; 64% by weight of denatured ethanol; and 2% by weight of water produced by Mitsubishi Chemical Corporation under the trade name "Suftomer-ST-2000H") so that the dried coating thickness was made to be 0.1 μm, followed by drying.

Subsequently, an adhesive sheet was fabricated by coating the surface of said antistatic layer with 100 parts by weight of an acrylic adhesive (produced by Ipposha Oil Industries Co., Ltd. under the trade name "AS 665") incorporated with 4 parts by weight of isocyanate-based curing agent (produced by Toyo Ink Mfg. Co., Ltd. under the trade name "BHS 8515") by means of knife coating system so that the dried coating thickness was made to be 23 μm, drying the resultant coating at 80° C. for 2 minutes so as to form an acrylic adhesive agent layer, and further sticking a release sheet of paper thereon.

EXAMPLE 2

An antistatic layer was formed by a method wherein a biaxially oriented polyethylene terephthalate (PET) film having a thickness of 38 μm as the plastic substrate film was coated on one side with a surface coating type antistatic agent solution containing a low molecular type quaternary ammonium salt (blended antistatic agent composition in liquid form consisting of 100 parts by weight of a UV ray curing acrylic binder (produced by Nippon Kayaku Co., Ltd. under the trade name "Kayarad DPHA"); 3 parts by weight of 1-hydroxycyclohexyl phenyl ketone as the polymerization initiator for said acrylic binder; 20 parts by weight of tetraethylammomium chloride as the antistatic agent; and 280 parts by weight of toluene as the solvent) so that the dried coating thickness was made to be 1 μm, the resultant coating was dried, and then the dried coating was irradiated with UV ray at a light irradiation density of 240 mJ/cm$^2$ by the use of a high pressure mercury-vapor lamp.

Subsequently, an adhesive sheet was fabricated by coating the surface of said antistatic layer with 100 parts by weight of an acrylic adhesive (produced by Ipposha Oil Industries Co., Ltd. under the trade name "AS 665") incorporated with 4 parts by weight of isocyanate-based curing agent (produced by Toyo Ink Mfg. Co., Ltd. under the trade name "BHS 8515") by means of knife coating system so that the dried coating thickness was made to be 23 μm, drying the resultant coating at 80° C. for 2 minutes so as to form an acrylic adhesive agent layer, and further sticking a release sheet of paper thereon.

Subsequently, evaluations were made of the release charge voltage and total light transmissivity of the adhesive sheet thus obtained according to the evaluation procedures described hereinafter. As the result, the release charge voltage was 0.0 KV and the total light transmissivity was 90.2%.

COMPARATIVE EXAMPLE 1

The procedure in Example 1 was repeated to fabricate an adhesive sheet except that an antistatic layer was not formed.

COMPARATIVE EXAMPLE 2

The procedure in Example 1 was repeated to fabricate an adhesive sheet except that an antistatic layer was installed directly on an easy-to-print layer for the PET film instead of installing it on the opposite side of the easy-to-print layer.

COMPARATIVE EXAMPLE 3

The procedure in Example 1 was repeated to fabricate an adhesive sheet except that the antistatic layer installed on the PET film was composed of 100 parts by weight of an acrylic-based binder and 300 parts by weight of tin oxide-based powders having an average particle diameter of 0.02 μm dispersed therein in place of the quaternary ammonium salt.

Subsequently, evaluations were made of the following various physical properties of each of the adhesive sheets which had been obtained in Examples 1 to 2 and Comparative Examples 1 to 3, respectively in accordance with the evaluation procedures as described hereunder. The results are collectively given in Table 1.

(1) Release charge voltage (kV)

A release sheet of paper was peeled off at 500 mm/min under the conditions including a temperature of 23° C. and a relative humidity of 65%, and thereafter a measurement was made of the electric charge voltage on the surface of the adhesive agent layer at a distance of 50 mm by the use of an electrostatic potential measuring instrument KSD-6110 (manufactured by Kasuga Electrical Instrument Mfg. Co., Ltd.).

(2) Total light transmissivity (%)

A measurement was made of the total light transmissivity of the adhesive sheet without release sheet in accordance with JIS K7105 by the use of a haze meter-NDH-Σ80 (manufactured by Japan Electrical Color Industries Co., Ltd.).

(3) Printability

An evaluation was made of the printability by a method wherein a ultraviolet ray curing ink (manufactured by T & K Toka Co., Ltd. under the trade name "BESTCURE 161 Sumi S") was used to print in a thickness of 0.5 µm by letterpress printing system on the surface of the easy-to-print layer (Example 1 and Comparative Examples 1 and 3) or the antistatic layer (Comparative Example 2), the inked surface was irradiated with ultraviolet rays at a light irradiation density of 120 mJ/cm$^2$ by the use of a high pressure mercury-vapor lamp, and thereafter ink adhesion test was carried out in accordance with JIS K5400. Thus, the result free from ink release was marked with "G" (good), and the result revealing ink release was marked with "R" (rejection).

TABLE 1

| | Example 1 | Comp. Example 1 | Comp. Example 2 | Comp. Example 3 |
|---|---|---|---|---|
| Release charge voltage (kV) | 0.0 | 3.0 | 0.0 | 0.0 |
| Total light transmissivity (%) | 90.2 | 90.3 | 90.2 | 78.1 |
| Printability | G | G | R | G |

{Remarks}

(1) Comp.: Comparative (2) The total light transmissivity of the substrate PET film equipped with easy-to-print layer: 90.8%.

What is claimed is:

1. An antistatic adhesive sheet, comprising:
   a plastic substrate film;
   an antistatic layer which is formed on either side thereof and which comprises an antistatic quaternary ammonium salt; and
   an adhesive agent layer formed on said antistatic layer;
   wherein said antistatic quaternary ammonium salt is a polymer having a group represented by formula (I)

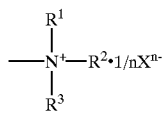

wherein
   $R^1$ and $R^2$ may be the same or different and are each an alkyl group having 1 to 10 carbon atoms;
   $R^3$ is an alkyl group having 1 to 10 carbon atoms or an aralkyl group having 7 to 10 carbon atoms;
   $X^{n-}$ is an n-valency anion; and
   n is an integer from 1 to 4.

2. The antistatic adhesive sheet according to claim 1, wherein a coat layer is formed on the opposite side to the adhesive agent layer for the plastic substrate film.

3. The antistatic adhesive sheet according to claim 2, wherein the coat layer is a printable layer.

4. The antistatic adhesive sheet according to claim 2, wherein the coat layer is a scratch resistance coat layer.

5. The antistatic adhesive sheet according to claim 1, wherein total light transmissivity of said sheet is at least 80%.

6. The antistatic adhesive sheet according to claim 2, wherein total light transmissivity of said sheet is at least 80%.

7. The antistatic adhesive sheet according to claim 1, wherein said plastic substrate film comprises at least one resin selected from the group consisting of a polyolefinic resin, an ethylene copolymer resin, a polystyrene resin, a polyamide resin, a polyester resin, a polycarbonate resin, a polysulfone resin, a fluorine containing resin, an acrylic resin, a polyvinyl alcohol, a polyvinyl acetate, an ionomer resin, a polyacetal, a polyamide imide, a polyether imide, a thermoplastic imide, a polyether ether ketone, a polyphenylene ether, a polyphenylene sulfide and a polymethylpentene.

8. The antistatic adhesive sheet according to claim 1, wherein said plastic substrate film is a monolayer film or laminate film having at least two layers.

9. The antistatic adhesive sheet according to claim 1, wherein a thickness of the plastic substrate film is 10 to 300 µm.

10. The antistatic adhesive sheet according to claim 1, wherein a primer layer is formed between said substrate layer and said antistatic layer.

11. The antistatic adhesive sheet according to claim 10, wherein a thickness of the primer layer is 0.1 to 10 µm.

12. The antistatic adhesive sheet according to claim 1, wherein said antistatic quaternary ammonium salt has a weight-average molecular weight of 10,000 to 1,000,000.

13. The antistatic adhesive sheet according to claim 1, wherein the antistatic quaternary ammonium salt has a unit selected from the group consisting of a polyvinyl benzyl, a poly(meth)acrylate, a random styrene/(meth)acrylate copolymer, a styrene/(meth)acrylate block copolymer, a random styrene/maleimide copolymer, a styrene/maleimide block copolymer, a random methacrylate/methacrylimide copolymer and a methacrylate/methacrylimide block copolymer.

14. The antistatic adhesive sheet according to claim 1, wherein the antistatic quaternary ammonium salt in the present invention may be used alone or in combination with at least one quaternary ammonium salt represented by formula (II)

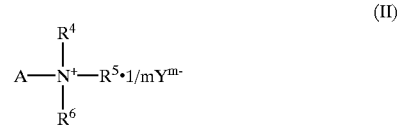

wherein
   A is an alkyl group having 1 to 30 carbon atoms;
   $R^4$ and $R^5$ are each an alkyl group having 1 to 10 carbon atoms and may be the same or different;
   $R^6$ is an alkyl group having 1 to 10 carbon atoms or an aralkyl group having 7 to 10 carbon atoms;
   $Y^{m-}$ is an m-valency anion; and
   m is an integer from 1 to 4.

15. The antistatic adhesive sheet according to claim 1, wherein a thickness of the antistatic layer is 0.01 to 10 µm.

16. The antistatic adhesive sheet according to claim 1, wherein a thickness of the adhesive layer is 5 to 100 µm.

17. The antistatic adhesive sheet according to claim 3, wherein a thickness of said printable layer is 0.2 to 30 µm.

18. The antistatic adhesive sheet according to claim 4, wherein a thickness of the scratch resistance coat layer is 0.5 to 20 µm.

* * * * *